US009963282B2

(12) United States Patent
Waszkowski

(10) Patent No.: US 9,963,282 B2
(45) Date of Patent: May 8, 2018

(54) ADHESIVE SYSTEM APPARATUS AND METHOD

(71) Applicant: Eurotech Distributors, Inc., Northfield, OH (US)

(72) Inventor: Paul John Waszkowski, Hinckley, OH (US)

(*) Notice: Subject to any disclaimer, the term of this patent is extended or adjusted under 35 U.S.C. 154(b) by 312 days.

(21) Appl. No.: 14/672,111

(22) Filed: Mar. 28, 2015

(65) Prior Publication Data

US 2016/0280432 A1  Sep. 29, 2016

(51) Int. Cl.
*B60R 16/02* (2006.01)
*B65D 63/10* (2006.01)
*H01B 7/00* (2006.01)

(52) U.S. Cl.
CPC ...... *B65D 63/1009* (2013.01); *B60R 16/0207* (2013.01); *B60R 16/0215* (2013.01); *B65D 63/1018* (2013.01); *H01B 7/0045* (2013.01)

(58) Field of Classification Search
None
See application file for complete search history.

(56) References Cited

U.S. PATENT DOCUMENTS

| 467,967 | A | * | 2/1892 | Allen | B65D 63/1018 |
| | | | | | 2/321 |
| 3,913,179 | A | * | 10/1975 | Rhee | B65D 63/1027 |
| | | | | | 24/16 PB |
| 5,827,589 | A | | 10/1998 | Autterson | |
| 6,044,525 | A | * | 4/2000 | Sastre | B65D 63/1018 |
| | | | | | 24/16 PB |
| 6,698,068 | B2 | | 5/2004 | Autterson | |
| D510,856 | S | * | 10/2005 | Cheung | D8/394 |
| 2007/0186388 | A1 | * | 8/2007 | Rome | B65D 63/1018 |
| | | | | | 24/16 PB |

FOREIGN PATENT DOCUMENTS

WO  WO-2016032262 A1 * 3/2016 ............. B65D 75/54

* cited by examiner

*Primary Examiner* — Barbara J Musser
(74) *Attorney, Agent, or Firm* — Robert J. Yarbrough of Lipton, Weinberger & Husick

(57) ABSTRACT

An adhesive system comprises a carrier and an adhesive for attaching objects, such as a wiring harness, to a support surface, such as the structure of a motor vehicle, aircraft or appliance. The adhesive system features two end portions and a strap portion. An opening in one end portion is configured to receive the other end portion. The opening has a width normal to the longitudinal axis of the carrier that is configured to receive the strap portion of the carrier to define a loop. The carrier may be configured so that the loop maintains a closed condition about an object. Pressure sensitive adhesive disposed on one side of the end portions allows the carrier to be securely attached to a support surface.

25 Claims, 14 Drawing Sheets

ADHESIVE SYSTEM APPARATUS AND METHOD

I. BACKGROUND OF THE INVENTION

A. Field of the Invention

Figure 1:
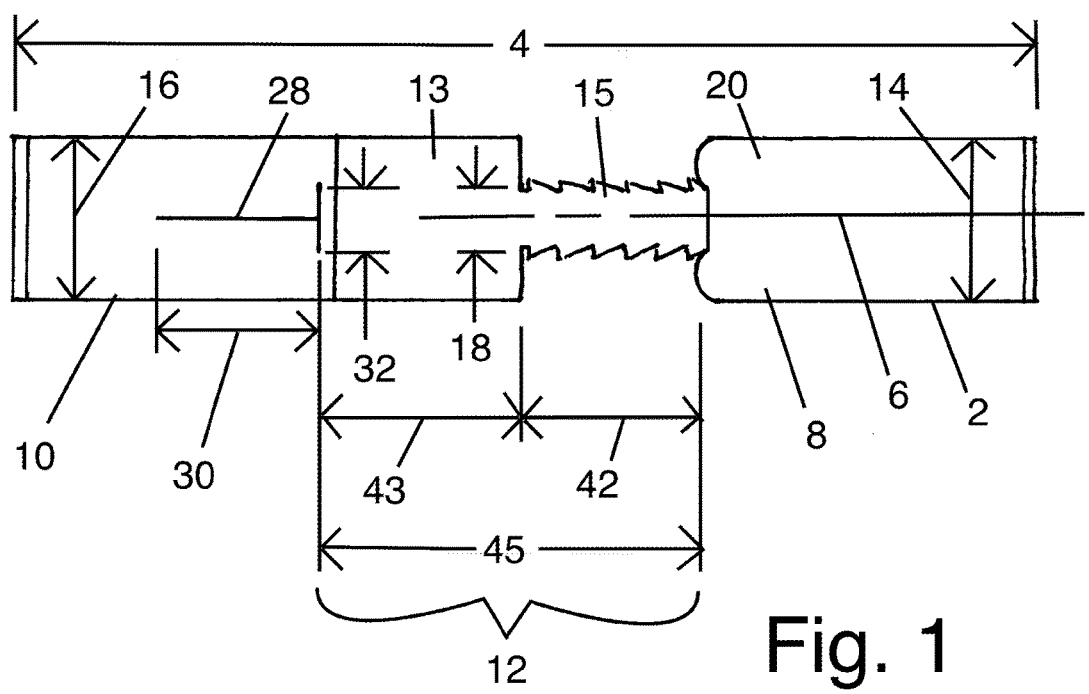

The adhesive system and method of the invention are for securing an object to a support surface. An example of an object to be secured is a bundle of wires in a wiring harness for an automobile, aircraft, appliance or other device having wiring as a part of the device. While the adhesive system of the invention may secure a plurality of objects, the adhesive system may be used to secure a single object, such as a wire, to a support surface. The adhesive system of the invention may be used to secure other objects, such as bundles of tubes or hoses. The method is a method of using the adhesive system of the invention.

B. Statement of the Related Art

In the adhesive products industry, an 'adhesive system' is a combination of an adhesive and a carrier. The 'adhesive' is applied to or otherwise disposed on the carrier. The adhesive selectably adheres the carrier to a support surface. The 'carrier' is a polymer tape or other substrate and provides mechanical strength to the adhesive system.

Wiring in a motor vehicle, aircraft or appliance may comprise a single wire or may comprise one or more wiring harnesses to connect various electrical systems to each other, to sources of power and to control systems. The integrity of the wiring is crucial to preserve the operation of those electrical systems. To secure the wiring and to prevent chafing and damage to the wiring, the wiring generally is attached to the structure of the motor vehicle, aircraft, appliance or other device by fasteners that penetrate holes through the structure. The holes must be drilled, punched or otherwise prepared in the structure of the motor vehicle, aircraft, appliance or other device, which may require multiple manufacturing steps. Each hole is in a fixed location, which limits construction flexibility. For structures featuring steel construction, the holes can present opportunities for rust.

The wiring harness usually is constructed separately from the remainder of the motor vehicle, aircraft, appliance or other device. During manufacture of the wiring harness, fasteners are connected to the wiring harness at pre-defined locations and orientations. Because the fasteners will be connected to holes at specific locations on the structure of the motor vehicle, aircraft, appliance or other device, the precise location and orientation of the fasteners on the wiring harness is critical. The unforgiving nature of the fastener location and orientation on the wiring harness results in waste and substantial coordination, inspection, testing and re-work expenses for both the wiring harness manufacturer and the manufacturer of the motor vehicle, aircraft, appliance or other device.

The prior art does not teach the apparatus or method of the Invention.

II. BRIEF DESCRIPTION OF THE INVENTION

The Invention is an adhesive system comprising a carrier and an adhesive disposed on the carrier. The carrier may be selectably formed into a loop to grasp an object inside the loop. The object may be a bundle of wires in a wiring harness, a bundle of tubing or pipes, or any other group of objects or single object that may be retained by the loop. Tension applied to the opposing end portions of the carrier closes the loop about the object. The carrier may mechanically retain the loop in the closed condition, securing the carrier to the object and the object to the carrier. Pressure sensitive adhesive disposed on one side of the two opposing end portions of the carrier selectably secures each of the two end portions and hence the loop and object to a support surface. The support surface may be the structure of a motor vehicle, aircraft, appliance, device or any other surface to which the pressure sensitive adhesive will adhere.

Where the object is a wiring harness, the adhesive system may be attached to the wiring harness during the manufacture of the wiring harness and will be retained in place on the wiring harness by the closed condition of the loop. Because the pressure sensitive adhesive attaches the carrier to the support surface, holes penetrating the structure of the motor vehicle, aircraft, appliance or other device are not required, avoiding the manufacturing steps of preparing the holes and avoiding corrosion caused by holes. Because the location of the carrier on the support surface is not limited to the location of a hole, the manufacturer may mount the wiring harness in any convenient location, allowing manufacturing flexibility. Because the location and orientation of the adhesive system is not critical, the time and expense associated with coordination, testing, repair and re-work of completed wiring harnesses by the harness manufacturer and by the manufacturer of the motor vehicle, aircraft, appliance or other device is reduced.

As used in this document, the term 'carrier' means a material having a length, a width and a thickness, where the width is less than the length and where the thickness is small compared to the length. The carrier may be of any suitable composition, such as a polymer, lamination of two or more materials, metallic composite, woven fabric or non-woven fabric. A film composed of polyethylene terephthalate ('PET') resin, which has relatively small elongation in response to tension and relatively high ultimate strength has proven suitable in practice.

The carrier defines a longitudinal axis along the length of the carrier. The carrier has a first end portion, a second end portion opposite to the first end portion and a central portion disposed between the first and second end portions. The central portion may be composed of a gripping portion and a strap portion. The strap portion is proximate to the first end portion and the gripping portion is proximate to the second end portion. Each of the first end portion, second end portion and strap portion defines a width. The first end portion width, strap portion width and second end portion width all are normal to the longitudinal axis. The strap portion width is less than the second end portion width. The strap portion width and first and second end portion widths are smaller than the length of the carrier.

The carrier is flexible and is capable of being curved into a loop along its longitudinal axis. When the carrier is curved into a loop, the longitudinal axis is also curved into a loop. The carrier is capable of being twisted by 90 degrees axially about the longitudinal axis to a twisted condition in which the orientation of the width of one end portion differs by 90 degrees from the orientation of the width of the other end portion. The carrier is capable of being returned to the un-twisted condition in which the widths of end portion and strap portion are parallel. The carrier has opposing first and second sides and pressure sensitive adhesive is disposed on the first side of the first end portion and on the first side of the second end portion.

The structure of the carrier that allows the carrier to be formed into a loop comprises an opening communicating through the second end portion of the carrier between the first and second sides. The opening has an opening length, which may be oriented along the longitudinal axis of the carrier. The opening length corresponds to the width of the first end portion.

To form the loop, a user will bend the carrier along its longitudinal axis so that the first end portion is proximal to the second end portion. The user also will twist the first end portion by 90 degrees so that the carrier is in the twisted condition and so that the width of the first end portion is generally parallel to the longitudinal axis at the opening. The user then will pass the first end portion through the opening defined by the second end portion. To complete the loop, the user will return the carrier to the un-twisted condition while the strap portion penetrates the opening so that the first end portion width, the central portion width, and the second end portion width all are parallel to each other and normal to the (now curved) longitudinal axis.

To grip an object and retain the loop in the closed condition, the user will apply tension to the opposing first and second end portions of the carrier, moving the loop from an open condition to a closed condition about the object. In the closed position, the gripping portion and strap portion comprising the loop grip the object so that the loop is stationary with respect to the object and the loop will neither rotate about the object nor slide with respect to the object.

To retain the loop in the closed condition, the opening has a width normal to the longitudinal axis of the carrier and parallel to the width of the strap portion when the carrier is in the un-twisted condition. The edges of the strap portion may be configured to engage the edges of the opening to allow the loop to move to the closed condition when the carrier is formed into the loop and tension is applied to the opposing ends of the carrier but to prevent movement of the loop from the closed condition to the open condition.

The configuration of the edges of the strap portion to engage the edges of the opening may be that the edges of the strap portion have a saw tooth configuration with each saw tooth having a sloping side and a non-sloping side. The saw teeth interfere with the edges of the opening and the sloping sides of the saw teeth allow the strap portion to pass through the opening in one direction as the loop is tightened to the closed condition. The edges of the opening stop the non-sloping sides of the saw teeth from moving in the opposite direction and prevent the loop from moving from the closed condition to the open condition.

To maintain the engagement between the edges of the opening and the saw teeth, the opening may be in the shape of a 'T,' with the stem of the 'T' oriented along the longitudinal axis and configured to receive the first end portion. The cross bar of the 'T' is located on the end of the stem closest to the central portion. In use, the carrier is moved to the twisted condition and inserted through the stem of the 'T.' The strap portion of the carrier is received by the cross bar of the 'T' and the saw teeth engage the edges of the 'T' when the carrier is moved to the non-twisted condition while the strap portion penetrates the opening.

The size, number of saw teeth per length of the strap portion and height of the saw teeth are selected to adequately retain the loop in the closed condition while gripping the object and to avoid failure of the saw teeth. If the saw teeth are too coarse; that is, if there are too few saw teeth and the saw teeth are too large, then the saw teeth will not allow the loop to adequately grip the object. If the saw teeth are too fine; that is, if there are too many saw teeth and the saw teeth are too small, then the individual saw teeth are too weak and will break or bend, allowing the loop to loosen.

To allow the loop to be selectably released and returned to the open condition by the user, the saw teeth may be curved or may be triangular in shape and may feature a slope on both sides. The slope of the sides or the size of the curved saw teeth or triangles and the degree of interference may be selected to determine the resistance to opening provided by the interference between the teeth and the edge of the opening. The slope of the sides of the saw teeth may be selected to be different between the two sides, so that a first force is required to tighten the loop and a different second force is required to loosen the loop.

To secure the carrier to a support surface, the first side of the first end portion and the first side of the second end portion of the carrier include a pressure sensitive adhesive. A peelable protective cover covers the pressure sensitive adhesive. In the adhesive products industry and as referred to herein, a peelable protective cover is referred to as a 'liner.' To attach the object to a support surface, the user will secure the loop about the object as described above and will peel off the liner, exposing the pressure sensitive adhesive. The user then will press the pressure sensitive adhesive against the support surface, adhering the first side of the first end portion and the first side of the second end portion to the support surface.

To avoid a waste disposal problem for the user and to avoid touching of the pressure sensitive adhesive by the user, the liner covering the pressure sensitive adhesive on the first end portion may be attached to the end of the first end portion distal to the central portion in a manner that cannot be readily removed, such as by thermal welding or by the liner being integral to the carrier. To apply the first end portion to the support surface, the user will peel the liner from the pressure sensitive adhesive on the first portion, leaving the liner attached to the end of the first end portion. The user will do the same to the liner on the second end portion, which is similarly attached. The user will then attach the pressure sensitive adhesive to the support surface with the liners still attached to the ends of the carrier.

The attached liner also provides a handle by which the user may apply tension to the first or second end portions to more effectively move the loop to the closed position. The following discussion addresses applying the first end portion and then the second end portion to the support surface. The discussion applies equally to the opposite sequence—applying the second end portion and then the first end portion to the support surface. To use the liner as a handle, the user may peel the liner from the first end portion and apply the exposed pressure sensitive adhesive to the support surface, securing the first end portion to the support surface. The user then will peel the liner from the pressure sensitive adhesive on the second end portion, exposing the pressure sensitive adhesive and leaving the liner attached to the end of the second end portion. The user will grip and pull the liner attached to the second end portion, applying tension to the carrier and tightening the loop about the object. The user will then apply the exposed pressure sensitive adhesive on the second end portion to the support surface. The user grips the adhesive system by the liner and not by the exposed pressure sensitive adhesive, which is an advantage.

For the embodiments of the adhesive system of the invention where the liner remains attached to the carrier after installation, no waste is generated during the installation of the adhesive system. These embodiments present an advantage, particularly for use in manufacturing facilities that require that no waste be produced as a matter of policy, but also to reduce required clean up and to avoid potential safety issues due to waste slippery liners underfoot.

The carrier may include a first and a second stabilizer. In the manufacture of the carrier having a strap portion with a smaller width than the gripping portion or the end portions, the excess material of the carrier on either side of the strap portion may be cut away. Alternatively, the excess material on either side of the strap portion may be retained as the first and second stabilizer by not cutting the connection between that excess material and the first end portion or the gripping portion. In this alternative embodiment, the pressure sensitive adhesive covers the first side of the first and second stabilizers. When the carrier is formed into a loop about the object and the carrier is attached to the support surface by the pressure sensitive adhesive on the first and second end portions, the first and second stabilizers are secured to the object or loop using the pressure sensitive adhesive. The first and second stabilizer will resist a tendency of the object to roll.

The first and second stabilizers may be connected to either the first end portion or the gripping portion. Alternatively, one of the first and second stabilizers may be attached to the first end portion and the other attached to the gripping portion.

As an alternative to saw teeth, the crossbar of the 'T' shaped opening may define a tab projecting along the longitudinal axis away from the central portion. The tab defines a pawl. The central portion may include a plurality of tab-receiving openings in its surface and transverse to the longitudinal axis. The tab-receiving openings may be slots or indentations. The plurality of slots or indentations defines a ratchet. When the strap portion is in engagement with the crossbar of the 'T' shaped opening to define the loop, the pawl will engage the ratchet, allowing the loop to move in the direction of the closed condition but preventing the loop from moving in the direction of the open condition.

The first end portion may feature a lobe on either side of the strap portion. The lobes extend in the direction of the strap portion from the first end portion and provide additional resistance to peeling of the pressure sensitive adhesive on the first end portion. Pressure sensitive adhesives commonly fail by peeling; that is, force acting on the carrier lifts the edge of the pressure sensitive adhesive from the support surface. The peeling may continue until the adhesive joint fails completely. The lobes shift a part of the edge of the pressure sensitive adhesive toward the central portion so that for the pressure sensitive adhesive proximal to the lobes, the pressure sensitive adhesive does not experience the peeling force at the edge but at a distance from the edge. The result is a higher resistance to peeling.

The use of a lobe or lobes to move the vulnerable edge of a pressure sensitive adhesive away from a peeling force provides an advantage of additional peeling resistance and applies to any adhesive system using a pressure sensitive adhesive.

The strap portion of the central portion may not include saw teeth and may be sized to accommodate a range of sizes of objects, in which case the central portion will not retain the loop in a closed condition when tension is released on the opposing end portions of the carrier. Tension is maintained on the end portions to retain the loop in a closed condition about the object by the adhesion of the pressure sensitive adhesive on the end portions to the support surface.

III. BRIEF DESCRIPTION OF THE DRAWINGS

Figure 2:
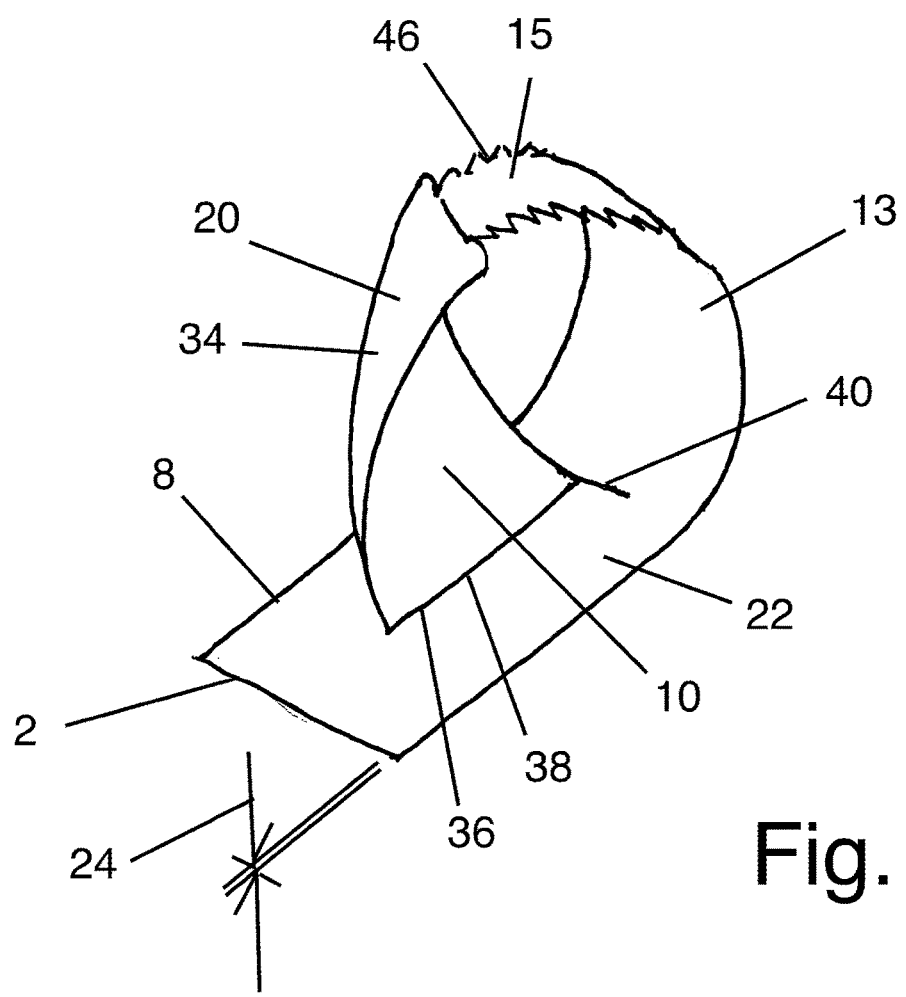
Figure 3:
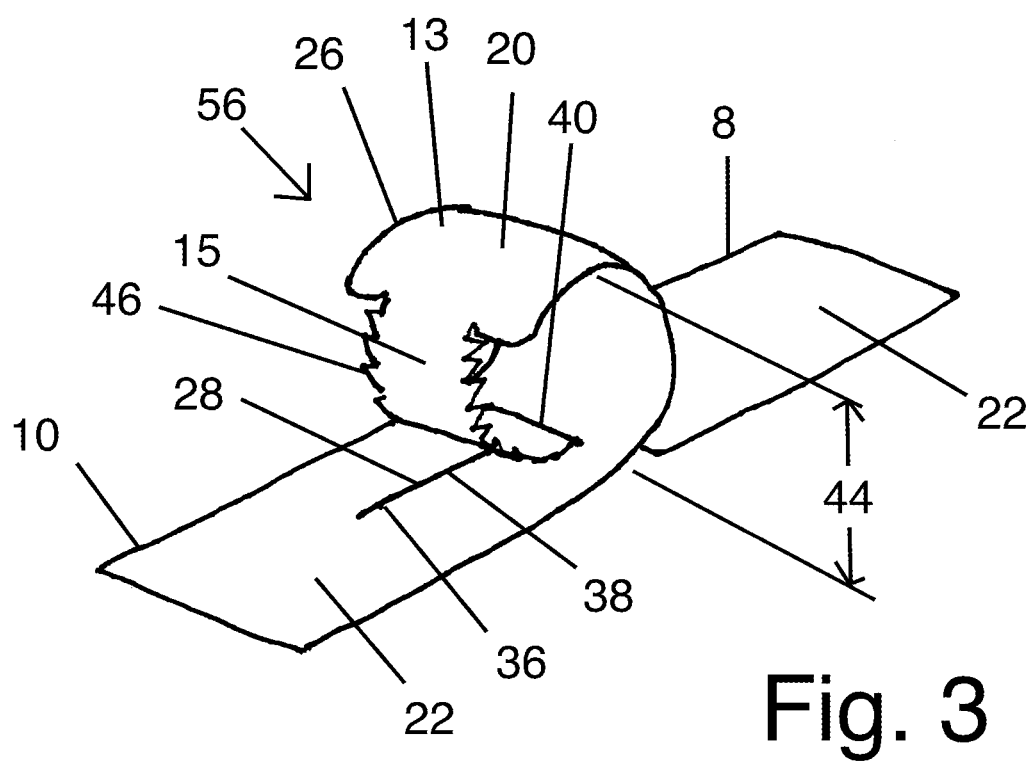
Figure 4:
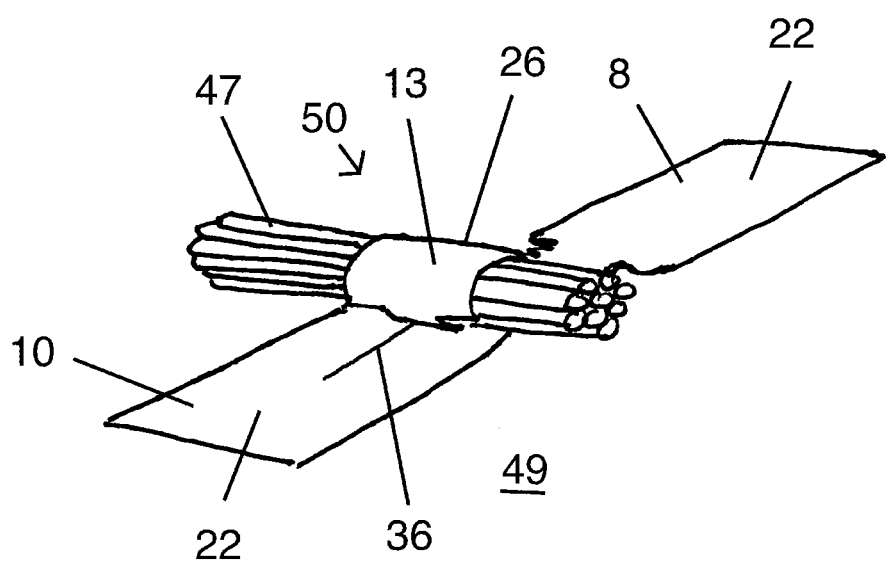
Figure 5:
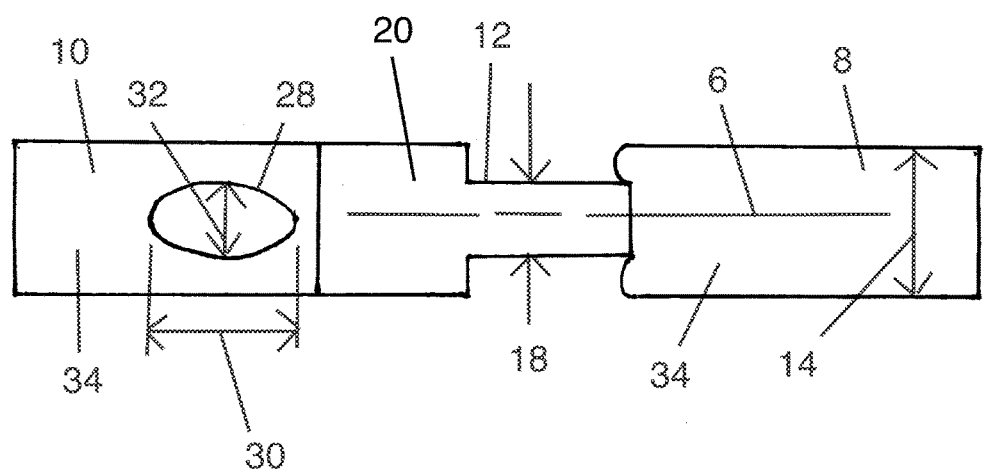
Figure 6:
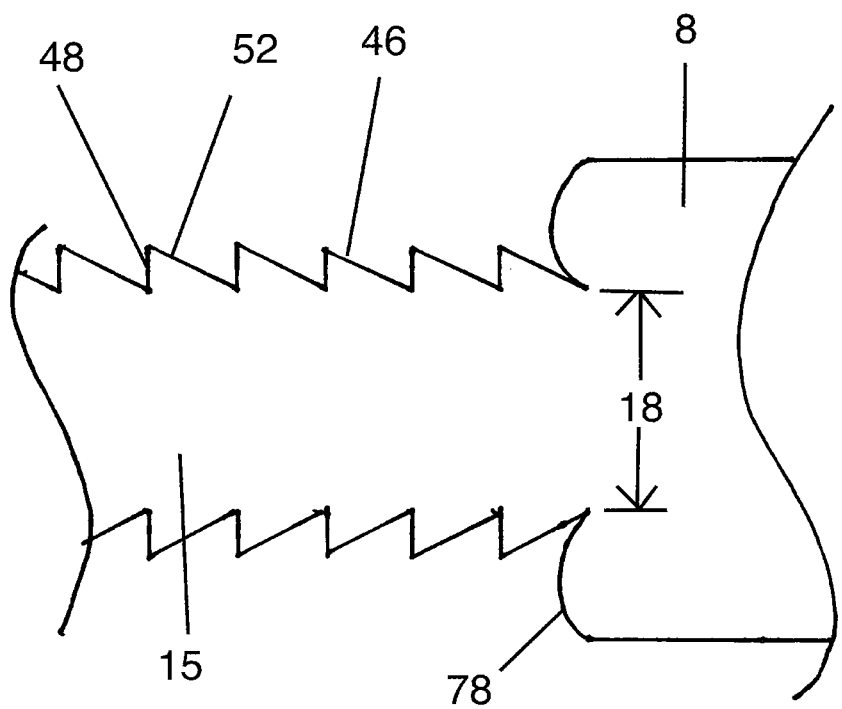
Figure 7:
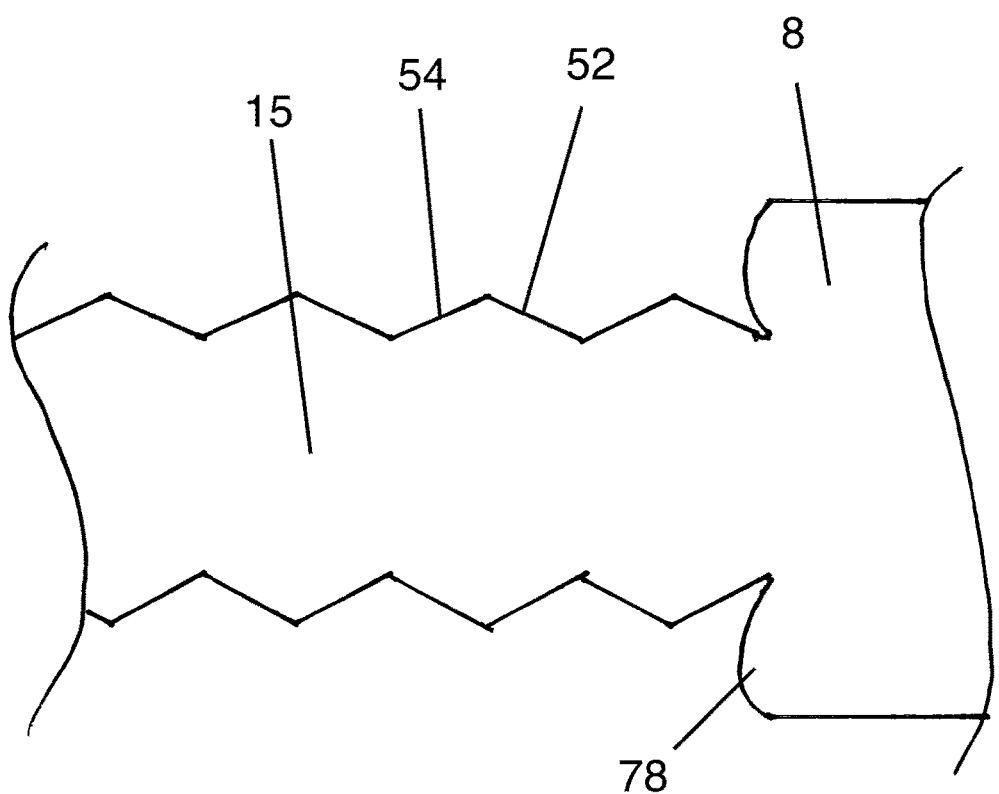
Figure 8:
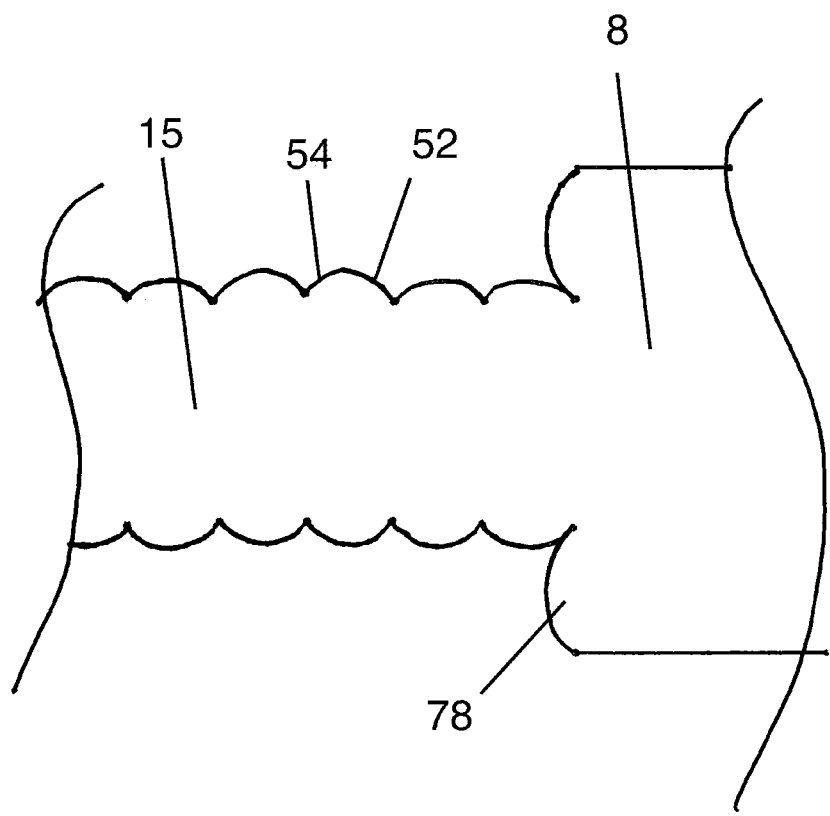
Figure 9:
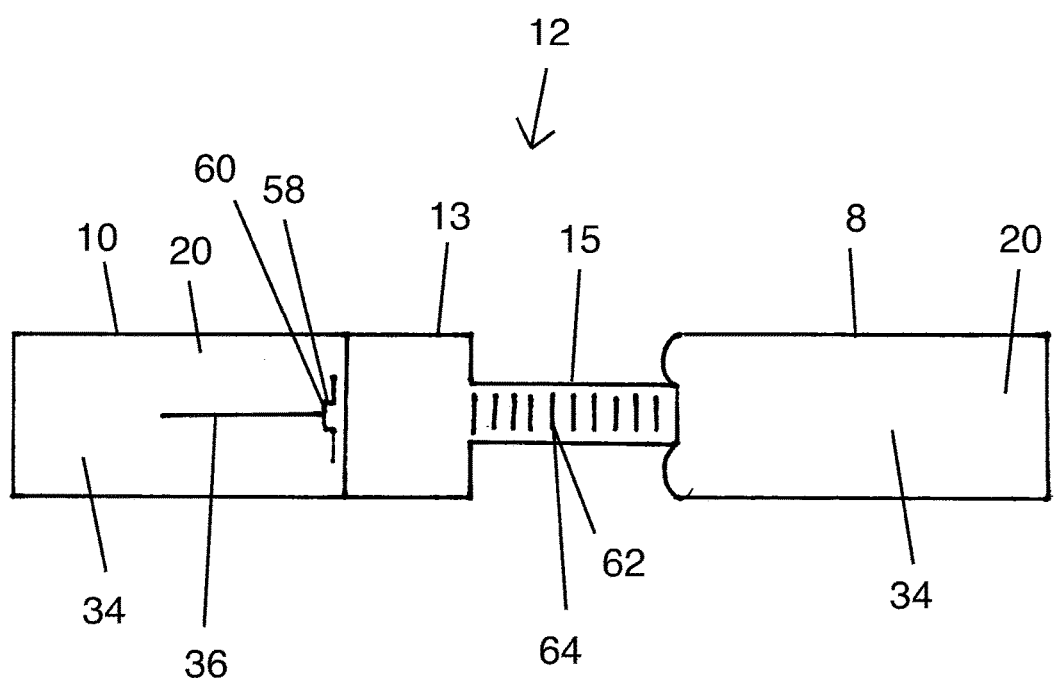
Figure 10:
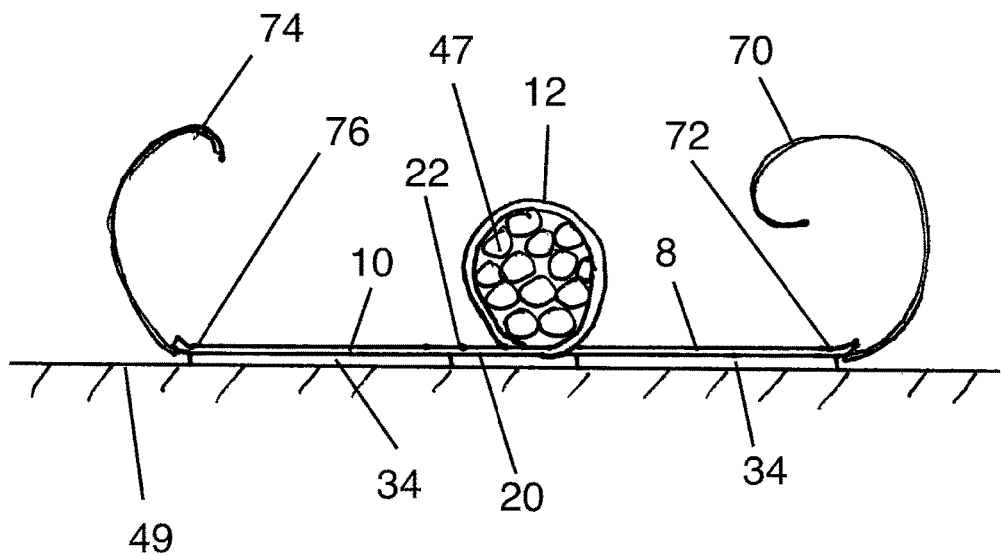
Figure 11:
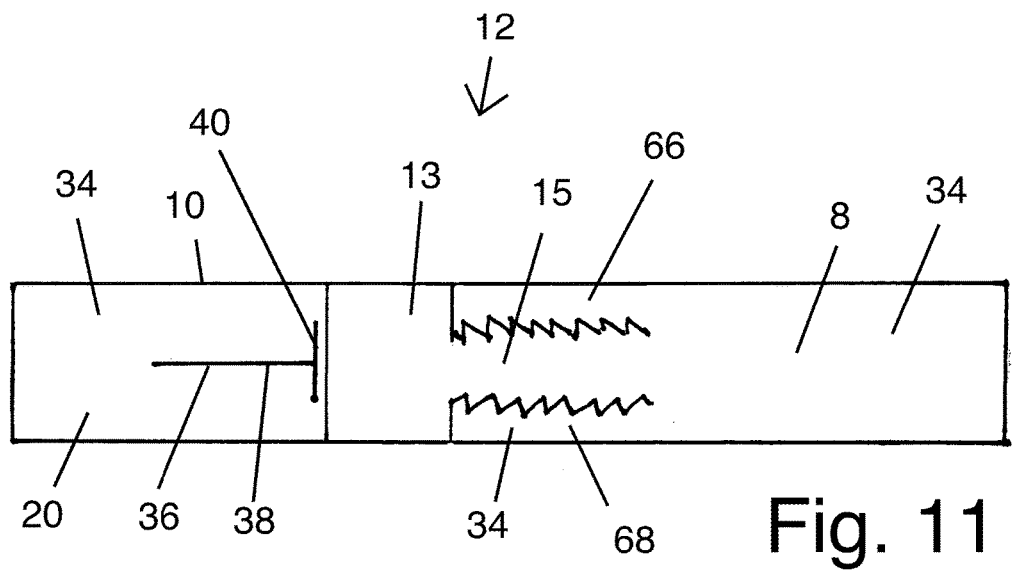
Figure 12:
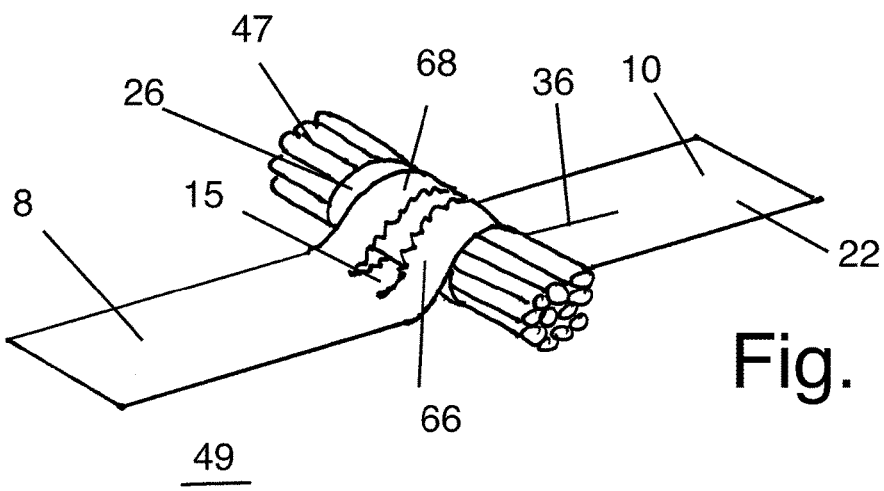
Figure 13:
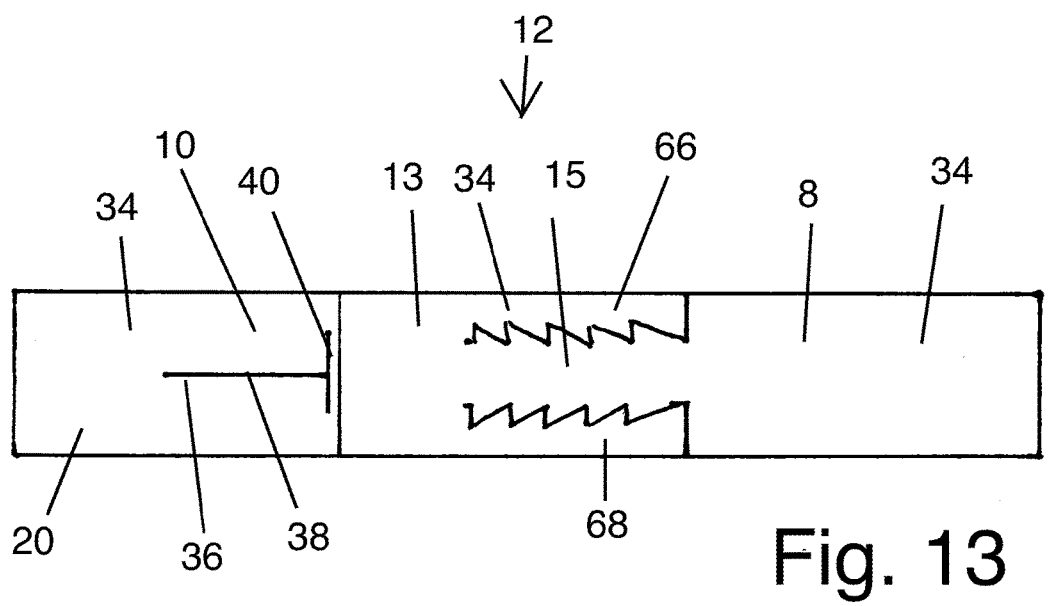
Figure 14:
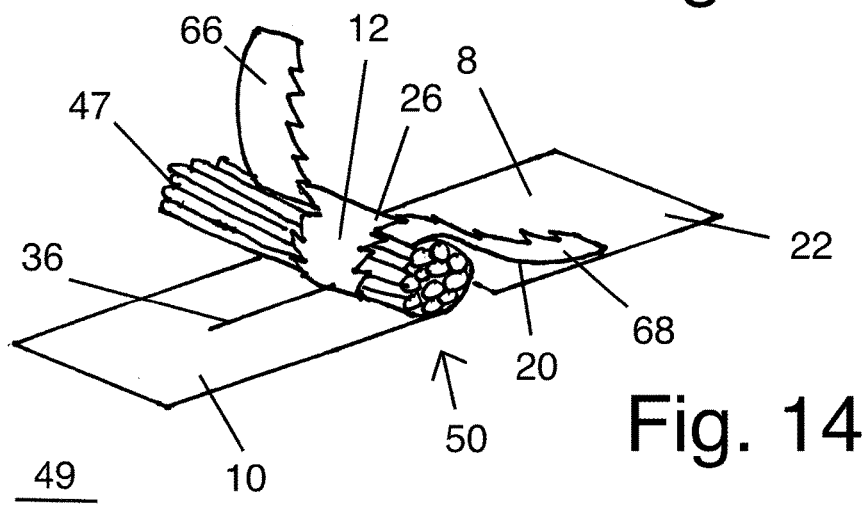
Figure 15:
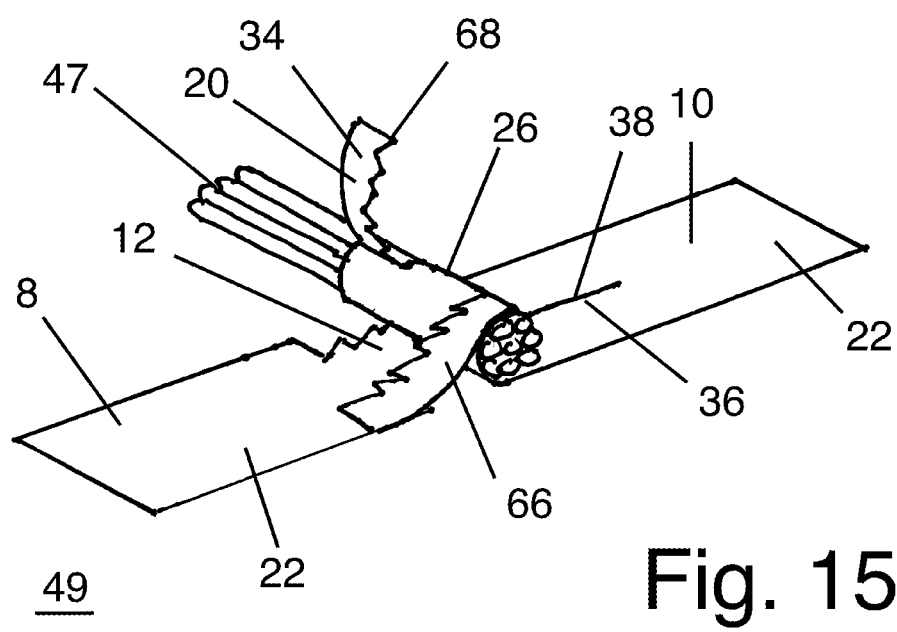
Figure 16:
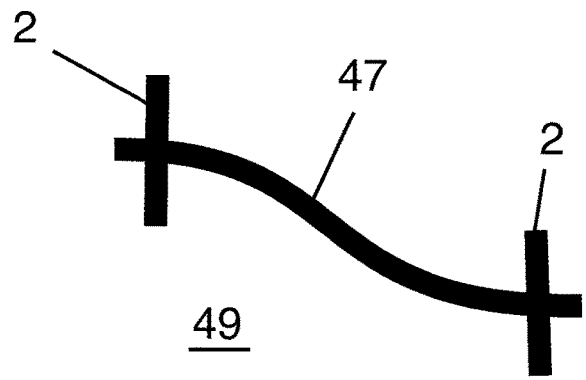
Figure 17:
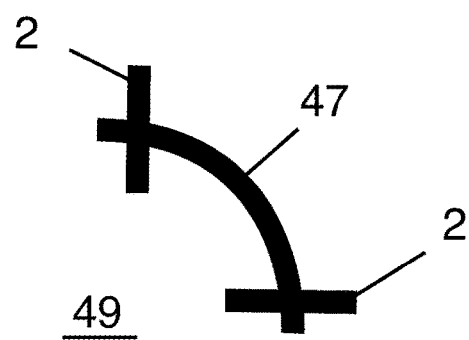
Figure 18:
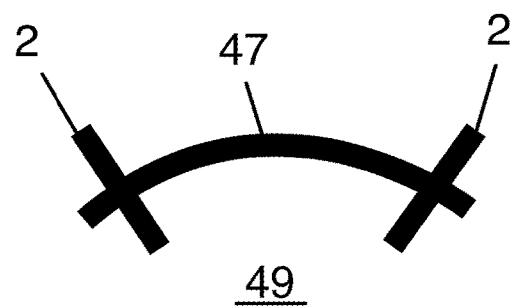

FIG. 1 is a plan view of the first side of the apparatus.
FIG. 2 is a perspective view of the apparatus with the first end portion inserted through the opening in the second end portion.
FIG. 3 is a perspective view of the loop.
FIG. 4 is a perspective view of the apparatus securing an object to a support surface.
FIG. 5 is a plan view of the first side of an alternative apparatus.
FIG. 6 is a detail cutaway view of the strap portion.
FIG. 7 is a detail cutaway view of an alternative strap portion.
FIG. 8 is a detail cutaway view of a second alternative strap portion.
FIG. 9 is a plan view of an alternative embodiment utilizing a pawl and ratchet.
FIG. 10 is a side view of the apparatus securing an object to a support structure and having permanently attached liners.
FIG. 11 is a plan view of the first side of an apparatus having first and second stabilizers attached to the first end portion.
FIG. 12 is a perspective view of apparatus of FIG. 11 supporting an object.
FIG. 13 is a plan view of the first side of an apparatus having first and second stabilizers attached to the second end portion.
FIG. 14 is a perspective view of the apparatus of FIG. 13 supporting an object.
FIG. 15 is a second perspective view of the apparatus of FIG. 13 supporting an object.
FIG. 16 is a first arrangement to prevent rolling of the object.
FIG. 17 is a second arrangement to prevent rolling of the object.
FIG. 18 is a third arrangement to prevent rolling of the object.

IV. DESCRIPTION OF AN EMBODIMENT

FIGS. 1 through 4 and 6 illustrate a first embodiment of the adhesive system of the invention. FIG. 1 is a plan view and shows a carrier 2 that has a length 4 and a longitudinal axis 6. The carrier 2 has a first end portion 8, a second end portion 10 and a central portion 12. The central portion 12 comprises a strap portion 15 proximal to the first end portion 8 and a gripping portion 13 proximal to the second end portion 10. The strap portion 15 has a strap portion length 42 and the gripping portion 13 has a gripping portion length 43. The sum of the strap portion length 42 and the gripping portion length 43 defines the central portion length 45.

The first end portion 8 has a first end portion width 14. The second end portion 10 has a second end portion width 16 and the strap portion 15 has a strap portion width 18. The first end portion width 14, the second end portion width 16 and the strap portion width 18 are normal to the longitudinal axis 6.

As shown by FIG. 2, the carrier 2 defines a first side 20 and a second side 22, which between them define a thickness 24. Thickness 24 is small compared to the length 4 of the carrier 2. A pressure sensitive adhesive 34 is disposed on the first side 20 of the carrier 2 at the first end portion 8 and the second end portion 10, as shown by FIGS. 1 and 2. An advantage of the adhesive system of the invention is that during manufacture the pressure sensitive adhesive 34 need be applied only to one side 20 of the carrier 2 and not to both sides 20, 22.

Also as shown by FIGS. 1 and 2, second end portion 10 defines an opening 28 that communicates through the carrier 2 between the first and second sides 20, 22. The opening 28 has an opening length 30 along the longitudinal axis 6 and an opening width 32 transverse to the longitudinal axis 6.

The opening 28 may be of any suitable shape. An opening 28 in the shape of a 'T' 36 has proven suitable in practice, with the stem 38 of the 'T' shape 36 oriented along the longitudinal axis 6 and the crossbar 40 of the 'T' shape 36 oriented transverse to the longitudinal axis 6.

As shown by FIG. 2, the carrier 2 is bendable along its length 4, with the longitudinal axis 6 following the bend of the carrier 2. The carrier 2 is also twistable to a twisted condition in which the width 14 of the first end portion 8 is oriented along the longitudinal axis 6 at the second end portion 10, with the first end portion width 14 oriented substantially normal to the second end portion width 16. The stem 38 of the opening 28 is configured to receive the first end portion 8 of the carrier 2. The configuration of the stem 38 to receive the first end portion 8 is that the length 30 of the opening 28 is sized to receive the width 14 of the first end portion 8 when in the twisted condition, all as shown by FIG. 2

From FIG. 3, after the first end portion 8 is inserted through the opening 28, the carrier 2 is un-twisted; that is, the carrier 2 is moved to the un-twisted condition shown by FIG. 3, so that the first end portion width 14, the second end portion width 16 and the strap portion width all are parallel to each other and generally normal to the longitudinal axis 6, and so that the strap portion 15 is received by the crossbar 40 of the 'T' shape 36. The configuration of the crossbar 40 of the 'T' shape 36 to receive the strap portion 15 is that the width 32 of the crossbar 40 corresponds to the width 18 of the strap portion 15.

The carrier 2 in the configuration shown by FIGS. 3 and 4 defines the loop 26. The loop 26 has a size 44 that can be anywhere within the range of adjustment of the loop between a minimum size and a maximum size. The range of adjustment of the loop 26 determines what sizes of objects 47 may be accommodated by the carrier 2. The maximum circumference and hence the maximum size 44 of the loop 26 is determined by the central portion length 45, which is the sum of the strap portion length 42 and the gripping portion length 43. The minimum circumference of the loop 26, and hence the minimum size 44 of the loop 26, is defined by the gripping portion length 43. A gripping portion length 43 that is generally equal to the strap portion length 42 has proven suitable in practice; however, any relative lengths 42, 43 of the strap portion 15 and gripping portion 13 are contemplated by the invention. The strap portion 15 and the gripping portion 13 may be of any convenient relative lengths 42, 43, provided that adequate gripping portion 13 remains to supply necessary mechanical strength to the loop 26 when the strap portion 15 and second end portion define the loop 26. The strap portion length 42 may be large or small compared to the central portion length 45.

An object 47 may be disposed within the loop 26. In the instance illustrated by FIG. 4, the object 47 is a bundle of wires, as in an automobile, aircraft or appliance wiring harness. The pressure sensitive adhesive 34 disposed on the first side 20 of the carrier 2 may be used to affix the carrier 2 and hence the object 47 to a support surface 49, for example the structure of an automobile, aircraft, appliance, or to any other structure to which the pressure sensitive adhesive 34 will adhere. FIG. 3 illustrates the loop 26 in the open condition 56, in which the size of the loop 44 is relatively large and the loop 26 is not closed around an object 47. FIG. 4 illustrates the loop 26 in the closed condition 50, in which the size 44 of the loop 26 is relatively small. The loop 26 may be closed around the object 47 when the loop 26 is in the closed condition 50.

FIG. 5 is a plan view of a carrier 2 in which the opening 28 defines a length 30 and a width 32, but does not include a separate mechanism to hold the loop 26 in the closed position. To use the embodiment of FIG. 5, a user will create a loop 26 as described above about the object 47 and will apply tension to the first and second end portions 8, 10 to move the loop to the closed condition 50. While maintaining tension on the first and second end portions 8, 10, the user will attach the carrier 2 and object 47 to the support surface 49 using the pressure sensitive adhesive 34. The tension applied to the first and second end portions 8, 10, by the support surface 49 and pressure sensitive adhesive 34 maintains the loop 26 in the closed condition.

FIGS. 1-3 and 6-9 illustrate mechanisms to maintain the loop 26 in the closed condition without requiring the user to maintain tension between the first and second end portions 8, 10 and when the carrier 2 is not attached to the support surface 49. As shown by FIGS. 1 through 3 and 6, the strap portion 15 may define a plurality of saw teeth 46. The saw teeth 46 are configured to interfere with the edges of the crossbar 40 of the 'T' shape 36 when the strap portion 15 is in engagement with the crossbar 40 so that the strap portion 15 may move through the opening 28 to decrease the size of the loop 26 but may not move in the opposite direction to increase the size of the loop 26.

FIG. 6 is a detail cutaway of the saw teeth 46. Each saw tooth 46 defines a first sloped portion 52 and a non-sloped portion 48. The non-sloped portion 48 is generally normal to the longitudinal axis 6. Each first sloped portion 52 defines the edge of the saw tooth 46 proximal to the first end portion 8, while the non-sloped portion 48 defines the edge of the saw tooth 46 distal to the first end portion 8. The saw teeth 46 extend beyond the strap portion width 18, to which the cross bar width 32 corresponds, so that the saw teeth 46 interfere with the edges of the crossbar 40 of the 'T' shape 36 when the strap portion 15 and the cross bar 40 are in engagement. The first sloped portion 52 allows the strap portion 15 to advance through the crossbar 40 to tighten the loop 26. The non-sloped portion 48 interferes with the edges of the crossbar 40 and prevents the strap portion 15 from moving in the opposite direction.

FIG. 6 also illustrates lobes 78 defined by the first end portion 8. When pressure sensitive adhesive 34 disposed on the lobes 78 and on the first end portion 8 adheres to a support surface 49 (see FIG. 4), the lobes 78 resist peeling of the pressure sensitive adhesive 34 and hence the first end portion 8 from the support surface 49. As noted above, the lobes 78 move the edge of the pressure sensitive adhesive 34 toward the strap portion 15 and away from the location at which stress is applied, which is the junction between the strap portion 15 and the first end portion 8. The net effect is that the vulnerable edge of the pressure sensitive adhesive 34 experiences lower peeling stress for the same applied force and exhibits better resistance to peeling.

FIGS. 7 and 8 illustrate alternative saw teeth 46 configurations that allow the loop 26 to be moved to the closed condition and also allow the loop 26 to be selectably returned to the open condition. In the embodiment of FIG. 7, each saw tooth defines a first sloped portion 52 and an opposing second sloped portion 54. The first sloped portion is proximal to the first end portion 8 and the second sloped portion is distal to the first end portion 8. The ends of the saw teeth 46 interfere with the edges of the crossbar 40. The opposing sloped portions 52, 54 allow the loop 26 to be moved to the closed position and also to be moved to the open position. FIG. 8 is similar to FIG. 7, except that the saw teeth 46 are curved. The curved tops of the saw teeth 46 allow the loop 26 to be moved both to the open and closed positions.

FIG. 9 illustrates an alternative mechanism to maintain the loop 26 in the closed condition 50. From FIG. 9, the crossbar 40 of the T-shape 36 opening 28 defines a tab 58. The strap portion 15 defines a plurality of tab-receiving openings 62 penetrating the carrier 2. Tab-receiving openings 62 may be slots or may be indentations in the carrier 2 sufficient to catch the tab 58. The tab-receiving openings 62 are disposed transverse to the longitudinal axis 6. When the first end portion 8 is inserted through the stem 38 and the strap portion 15 is placed in engagement with the crossbar 40, the tab 58 becomes a pawl 60 and the pawl 60 engages the tab-receiving openings 62, which then define a ratchet 64. The combination of the pawl 60 and ratchet 64 allows the loop 26 to move to the closed condition 50 and retains the loop 26 in the closed condition 50.

FIG. 10 illustrates an alternative embodiment. A conventional pressure sensitive adhesive 34 utilizes a liner that is disposed on the pressure sensitive adhesive 34 and protects the pressure sensitive adhesive 34 from premature adhesion. The liner features a release material that allows the liner to be peeled from the pressure sensitive adhesive 34, leaving the pressure sensitive adhesive 34 ready to adhere to a support surface 49. A peelable conventional liner becomes waste that is collected and disposed by the user once the liner is peeled from the pressure sensitive adhesive 34. In the alternate embodiment of FIG. 10, a first liner 70 and second liner 74 are permanently attached to the carrier 2 and remain attached after installation of the carrier 2 on the support surface 49. As shown by FIG. 10, the first liner 70 is permanently attached to the first end 72 of the carrier 2, as by thermal welding, by use of an adhesive, by use of a mechanical fastener, or by the liner 70 being defined by the first end portion 8. The second liner 74 is similarly attached the second end 76 of the second end portion 10 or is defined by the second end portion 10. In use, the loop 26 of the central portion 12 is placed in the closed condition 50 about an object 47. The pressure sensitive adhesive 34 is disposed on the first side 20 of the carrier 2. The first and second liners 70, 74 cover the pressure sensitive adhesive 34. The first and second liners 70, 74 are peeled from the pressure sensitive adhesive 34 and the pressure sensitive adhesive 34 is applied to the support surface 49, completing installation. The liners 70, 74 remain attached to the carrier 2, becoming part of the motor vehicle, aircraft, appliance or other device and generating no waste.

As described above, the attached liners 70, 74 also provide a handle by which the user may grip the adhesive system 2 and apply tension to the first or second end portions 8, 10 to more effectively move the loop 26 to the closed condition 50. To use the liners 70, 74 as a handle, the user may select an end portion 8, 10, peel the liner 70, 74 from the selected first or second end portion 8, 10 and apply the exposed pressure sensitive adhesive 34 to the support surface 49, securing the selected end portion 8, 10 to the support surface 49. The user then will peel the liner 70, 74 from the pressure sensitive adhesive 34 on the other end portion 8, 10, exposing the pressure sensitive adhesive 34 and leaving the liner 70, 74 attached to the other end portion 8, 10. The user will grip and pull the liner 70, 74 attached to the other end portion 8, 10, applying tension to the carrier 2 and tightening the loop 26 about the object 47. The user will then apply the exposed pressure sensitive adhesive 34 on the other end portion 8, 10 to the support surface 49. The user is able to grip the adhesive system 2 by the liner 70, 74 and is not required to touch the exposed pressure sensitive adhesive 34, which is an advantage.

FIGS. 11 through 15 illustrate the use of first and second stabilizers 66, 68. In the manufacture of the carrier 2 shown in FIGS. 1-9, the portion of the carrier 2 adjacent to the strap portion 15 in the direction transverse to the longitudinal axis 6 may be cut away and discarded as waste. In the embodiments illustrated by FIGS. 11-15, the portion of the carrier 2 adjacent to the strap portion 15 transverse to the longitudinal axis 6 is retained and utilized as first or second stabilizers 66, 68. In the embodiment illustrated by FIGS. 11 and 12, the first and second stabilizers 66, 68 remain attached to the first end portion 8. Pressure sensitive adhesive 34 is disposed on the first side 20 of the first and second end portions 8, 10 and on the first side 20 of the first and second stabilizers 66, 68.

In use and as illustrated by FIG. 12, the first end portion 8 with the first and second stabilizers 66, 68 attached is passed through the stem 38 of the 'T' shape 36 and the strap portion 15 is placed in engagement with the crossbar 40 of the 'T' shape 36. The user applies tension to the first and second end portions 8, 10, moving the loop 26 into the closed condition 50 about the object 47. Liners 70, 74 are removed from the pressure sensitive adhesive 34 on the first end portion 8 and the second end portion 10 are attached to the support surface 49 using the pressure sensitive adhesive 34. The first and second stabilizers 66, 68 then are attached to the loop 26 using the pressure sensitive adhesive 34. The first and second stabilizers resist rolling of the loop 26 and the object 47, thus reducing the potential that the pressure sensitive adhesive 34 will peel from the support surface 49.

FIGS. 13, 14 and 15 illustrate an alternative configuration of first and second stabilizers 66, 68. As shown by FIG. 13, first and second stabilizers 66, 68 are attached to the second end portion 10 rather than to the first end portion 8. FIGS. 14 and 15 illustrate the embodiment of FIG. 13 in use. FIG. 14 shows the carrier 2 with the second end portion 10 near to the viewer and FIG. 15 shows the carrier 2 with the first end portion 8 nearer to the viewer. As shown by FIGS. 14 and 15, the first end portion 8 is passed through the stem 38 of the 'T' shape 36 and the strap portion 15 is placed in engagement with the crossbar 40 of the 'T' shape 36, all as described above with respect to FIGS. 2 and 3. The loop 26 is moved to the closed condition 50 about the object 47, also as described with respect to FIGS. 2 and 3. Pressure sensitive adhesive 34 is disposed on the first side 20 of the first and second stabilizers 66, 68. The first and second stabilizers 66, 68 are folded so that the first side 20 of the first and second stabilizers 66, 68 is attached to the second side 22 of the first end portion 8. In FIG. 14, the first stabilizer 66 is shown prior to folding and the second stabilizer 68 is shown after folding. In FIG. 15, the first stabilizer 66 is shown as folded and attached to the first end portion 8 and the second stabilizer 68 is shown prior to folding. The attachment of the stabilizers 66, 68 between the loop 26 and the first end portion 8 reduces the tendency of the loop 26 and the object 47 to roll and to peel the pressure sensitive adhesive 34 from the support surface 49.

The first and second stabilizers 66, 68 of FIGS. 11-15 also may be used at the time of attachment of the carrier 2 to the object 47, as during manufacture of a wiring harness, to maintain the loop 26 in the closed condition 50.

As shown by FIGS. 16, 17 and 18, rolling of the loop 26 and of the object 47 also may be avoided by locating a carrier 2 on either side of a curve in the object 47 so that the shape of the object 47 resists any tendency of the object 47 to roll. FIG. 16 shows the object 47 in an 'S' shape with two carriers 2 oriented to be generally parallel and adhering to a support surface 49. FIG. 17 shows an object 47 curved in a sharp bend with carriers 2 secured to the object and located on either side of the bend. FIG. 18 illustrates the object curved into a gentle bend with carriers 2 adhering to the support surface 49 on either side of the bend. In each of the instances illustrated by FIGS. 16-18, the structure of the object 47 serves to resist any tendency of the object 47 to roll. Rolling of the loop 26 may also be reduced by securing the object 47 to a support surface 49 with two of the adhesive systems of the invention in close proximity, with the first end portion 8 of one of the carriers 2 located on one side of the object 47 and the first end portion 8 of the other carrier 2 located on the other side of the object 47.

The second side 22 of the gripping portion 13 or the strap portion 15 may be covered with a gripping aid to prevent slippage of the object 47 with respect to the gripping portion 13. The gripping aid may comprise an adhesive, a material having a tacky surface such as a natural or synthetic rubber, or a material that will fill the spaces between the object 47 and the gripping portion 13, such as a foam, felt or other deformable material.

The carrier may feature rounded transitions to reduce stress risers, cracking and failure of the carrier. For example, the transition between the strap portion 15 and the gripping portion 13 may be rounded. Similarly, the ends of the cross bar 40 and stem 38 of the 'T' shape 36 may be circular to reduce stress risers at that location. The junction between adjacent saw teeth 46 may be rounded to reduce stress risers resulting from the pulling interaction between the saw teeth 46 and the cross bar 40 of the 'T' slot 36.

LIST OF NUMBERED ELEMENTS

The following are the numbered elements illustrated in the drawings.
2 a carrier
4 a length
6 a longitudinal axis
8 a first end portion
10 a second end portion
12 a central portion
13 gripping portion
14 a first end portion width
15 a strap portion
16 a second end portion width
18 a strap portion width
20 a first side
22 a second side
24 a thickness
26 a loop
28 an opening
30 an opening length
32 an opening width
34 a pressure sensitive adhesive
36 a 'T' shape
38 a stem of the 'T'
40 a cross bar of the 'T'
42 a strap portion length
43 a gripping portion length
44 a size of the loop
45 a central portion length
46 a plurality of saw teeth
47 an object
48 a non-sloped portion
49 a support surface
50 a closed condition
52 a first sloped portion
54 a second sloped portion
56 an open condition
58 a tab
60 a pawl
62 a plurality tab-receiving openings
64 a ratchet
66 a first stabilizer
68 a second stabilizer
70 a first liner
72 a first end of the carrier
74 a second liner
76 a second end of the carrier
78 a lobe or anti-peel portion

I claim:

1. An adhesive system apparatus for securing an object to a support surface, the apparatus comprising:
   a. a carrier, said carrier having a carrier length and defining a longitudinal axis, said carrier having a first end portion, a second end portion opposite to said first end portion and a strap portion disposed between said first and second end portions, said first end portion having a first end portion width, said second end portion having a second end portion width, said strap portion having a strap portion width, said strap portion width being less than said second end portion width, said carrier having a first side and a second side opposite to said first side, said carrier having a thickness between said first and second sides, said thickness being small compared to said length, said carrier being bendable along said longitudinal axis to form a loop;
   b. an opening defined by said second end portion, said opening communicating between said first and second sides and having an opening length, said opening length corresponding to a larger of said first end portion width and said strap portion width, said opening defining an opening width normal to said longitudinal axis, said opening width corresponding to said strap portion width, said carrier defining said loop when said strap portion penetrates said opening and said first end portion width and said second end portion width and said strap width are substantially parallel;
   c. a pressure sensitive adhesive, said pressure sensitive adhesive being disposed on said first side of said first end portion and on said first side of said second end portion, said pressure sensitive adhesive being configured to adhere said first end portion and said second end portion to the support surface, said pressure sensitive adhesive not being disposed on said first side of said strap portion, whereby said first end portion may be inserted through said opening to define said loop about the object and whereby said loop and said pressure sensitive adhesive on both said first and said second end portions may secure both said loop and the object to the support surface.

2. The adhesive system apparatus of claim 1 wherein said length of said opening is oriented along said longitudinal axis, and wherein said carrier is twistable axially about said longitudinal axis from an un-twisted condition, in which said first end portion width and said second end portion width and said strap width are parallel, to a twisted condition, in which said first end portion width is oriented at 90 degrees to said second end portion width, and in which said first end portion width is generally parallel to said longitudinal axis at said opening for insertion of said first end portion through said opening, and from which twisted condition said carrier may be returned to said un-twisted condition when said strap portion penetrates said opening to define said loop.

3. The adhesive system apparatus of claim 2 wherein said opening is in the shape of a 'T,' a stem of said 'T' being oriented along said longitudinal axis, a cross bar of said 'T' being oriented normal to said longitudinal axis, said stem of said 'T' being configured to receive said first end portion when said carrier is in said twisted condition, said cross bar of said 'T' being configured to receive said strap portion when said carrier is returned to said un-twisted condition, whereby said first end portion may be twisted and inserted through said stem of said 'T' and untwisted so that said strap portion is received by said cross bar of said 'T' to define said loop.

4. The adhesive system apparatus of claim 3 wherein said strap portion has a strap portion length, said strap portion having a configuration to selectably engage and to be retained by said second end portion at said cross bar of said 'T' of said opening, whereby a size of said loop is selectable.

5. The adhesive system apparatus of claim 4, the apparatus further comprising:
   a. a gripping portion defined by said carrier, said gripping portion being disposed between said strap portion and said second end portion, said gripping portion having a width, said gripping portion width being greater than said strap portion width at a widest location of said strap portion, said gripping portion width being sized to not pass through said opening when said carrier defines said loop;
   b. said gripping portion having a gripping portion length, said loop having a minimum size and a maximum size, said gripping portion length defining a circumference of said loop when said loop has said minimum size, said gripping portion length and said strap portion length in combination defining said circumference of said loop when said loop has said maximum size.

6. The adhesive system apparatus of claim 5 wherein said gripping portion length and said strap portion length are substantially equal.

7. The adhesive system apparatus of claim 5 wherein one of said gripping portion and said strap portion is longer than another of said gripping portion and said strap portion.

8. The adhesive system apparatus of claim 5, the apparatus further comprising: a second stabilizer defined by said carrier, said second stabilizer being attached to said gripping portion, said second stabilizer not being attached to said strap portion and said first end portion, said pressure sensitive adhesive being disposed on said first side of said second stabilizer, whereby said second stabilizer may be attached to the object or said loop by said pressure sensitive adhesive to resist a rolling of said loop and the object.

9. The adhesive system apparatus of claim 4 wherein said configuration of said strap portion to selectably engage and to be retained by said second end portion comprises: said strap portion defining a plurality of saw teeth, each of said saw teeth comprising a sloped portion proximal to said first end portion and a non-sloped portion proximal to said second end portion, said saw teeth being configured to interfere with said second end portion at said cross bar of said 'T' shape when said strap portion is received by said cross bar of said 'T' shape, whereby said loop may be placed in a closed condition about the object and said interference between said saw teeth and said second end portion at said cross bar of said 'T' will retain said loop in said closed condition.

10. The adhesive system apparatus of claim 4 wherein said configuration of said strap portion to selectably engage and to be retained by said second end portion comprises: said strap portion edges defining a plurality of saw teeth, each of said saw teeth comprising a first sloped portion proximal to said first end portion and a second sloped portion proximal to said second end portion, said first sloped portion and said second sloped portion of said saw teeth being configured to interfere with said second end portion at said cross bar of said 'T' shape when said strap portion is received by said cross bar of said 'T' shape, said first and second sloped portions each defining a negative slope with increasing distance from a center of said saw tooth corresponding to said first and second sloped portions, whereby said loop may be placed in a closed condition about the object and said interference between said sloped portions of said saw teeth and said second end portion at said cross bar of said 'T' shape will retain said loop in said closed condition but said loop may be returned to an open condition.

11. The adhesive system apparatus of claim 10 wherein each of said first and second sloped portions is curved.

12. The adhesive system apparatus of claim 4 wherein said second end portion of said carrier has a tab defining a pawl at said cross bar of said 'T' shape and wherein said strap portion defines a plurality of tab-receiving openings transverse to said longitudinal axis, said tab-receiving openings in combination defining a ratchet configured to engage said pawl when said strap portion is received by said cross bar of said 'T' shape, said tab being configured to engage a one of said tab-receiving openings corresponding to said selected size of said loop.

13. The adhesive system apparatus of claim 1, the apparatus further comprising: a first stabilizer defined by said carrier, said first stabilizer being attached to said first end portion, said first stabilizer not being attached to said strap portion and said second end portion, said pressure sensitive adhesive being disposed on said first side of said first stabilizer, whereby said first stabilizer may be attached to the object or said loop by said pressure sensitive adhesive to resist a rolling of said loop and the object.

14. The adhesive system apparatus of claim 1, the apparatus further comprising:
   a. a first liner, said first liner being disposed on said pressure sensitive adhesive on said first end portion, said first liner being selectably peelable to expose said pressure sensitive adhesive, said first end portion defining a first end of said carrier, said first liner being permanently affixed to said first end portion proximal to said first end of said carrier;
   b. a second liner, said second liner being disposed on said pressure sensitive adhesive on said second end portion, said second liner being selectably peelable to expose said pressure sensitive adhesive, said second end portion defining a second end of said carrier opposite to said first end, said second liner being permanently attached to said second end portion proximal to said second end, whereby said first and second liners remain attached to said carrier when said pressure sensitive adhesive on both said first and said second end portions is securing said loop and the object to said support surface.

15. The adhesive system apparatus of claim 1 wherein said first end portion defines an anti-peel portion proximal to said strap portion, said pressure sensitive adhesive being disposed on said first side of said lobe, whereby said anti-peel portion resists peeling of said first end portion from said support surface when said pressure sensitive adhesive on said anti-peel portion and said first and said second end portions is securing said loop and the object to said support surface.

16. A method for securing an object to a support surface, the method comprising:
  a. providing a carrier having a length and defining a longitudinal axis, said carrier having a first side and a second side opposite to said first side, said carrier having a thickness defined by said first and second sides, said thickness being small compared to said length, said carrier defining a first end portion, a second end portion opposite to said first end portion and a strap portion disposed between said first and second end portions, said first end portion having a first end portion width, said second end portion having a second end portion width, said strap portion having a strap portion width, said strap portion width being less than said second end portion width, said second end portion defining an opening, said opening communicating between said first and second sides and having an opening length, said opening length being oriented along said longitudinal axis, said opening length corresponding to a larger of said first end portion width and said strap portion width, said opening defining an opening width normal to said longitudinal axis, said opening width corresponding to said strap portion width, said carrier having a pressure sensitive adhesive, said pressure sensitive adhesive being disposed on said first side of said first end portion and on said first side of said second end portion, said pressure sensitive adhesive not being disposed on said first side of said strap portion;
  b. twisting said carrier about said longitudinal axis so that said width of said first end portion is oriented substantially 90 degrees from said width of said second end portion;
  c. bending said carrier and inserting said first end portion through said opening in said second end portion to form a loop;
  d. untwisting said carrier so that said strap portion is disposed within said opening and said first end portion width, said second end portion width and said strap portion width are substantially parallel and normal to said longitudinal axis;
  e. closing said loop about the object.

17. The method of claim 16, the method further comprising: providing that said opening is in the shape of a 'T' with a stem of said 'T' being oriented along said longitudinal axis and a cross bar of said 'T' being normal to said longitudinal axis, said stem of said 'T' being configured to receive said first end portion, and said cross bar of said 'T' being configured to receive said strap portion.

18. The method of claim 17 wherein said step of closing said loop further comprises: retaining said loop in a closed condition, said strap portion defining a plurality of saw teeth, said saw teeth being configured to interfere with said second end portion when said strap portion is received by said cross bar of said 'T' shape, whereby an interference between said saw teeth and said second end portion retains said loop in said closed condition.

19. The method of claim 18 wherein each of said saw teeth comprises a sloped portion proximal to said first end portion and a non-sloped portion proximal to said second end portion, whereby said non-sloped portion of each of said saw teeth prevents said loop from moving from said closed condition.

20. The method of claim 18 wherein each of said saw teeth has a first sloped side proximal to said first end portion and a second sloped side proximal to said second end portion, said first and second sloped sides each defining a negative slope with increasing distance from a center of said saw tooth corresponding to said first and second sloped sides, and wherein said first sloped side and said second sloped side are configured to selectably engage said cross bar of said 'T' shape, whereby an interference between said first sloped side and said second sloped side and said second end portion at said cross bar of said 'T' shape retain said loop in said closed condition but allow said loop to be moved to an open condition.

21. The method of claim 20 wherein each of said teeth is curved.

22. The method of claim 17, further comprising: retaining said loop in a closed condition, said 'T' shaped opening defining a tab at said cross bar of said 'T' shaped opening and said strap portion defining a plurality of tab-receiving openings transverse to said longitudinal axis, said tab defining a pawl and said plurality of tab-receiving openings defining a ratchet, whereby said pawl will engage said ratchet to retain said loop in said closed condition when said strap portion is received by said cross bar of said 'T' shape.

23. The method of claim 16, the method further comprising: stabilizing said loop and the object by attaching a first stabilizer to said loop using said pressure sensitive adhesive, said first stabilizer being defined by said carrier and attached to said first end portion, said first stabilizer not being attached to said second end portion or to said strap portion, said pressure sensitive adhesive being disposed on said first side of said first stabilizer, whereby said first stabilizer resists rolling motion of said loop and the object.

24. The method of claim 16, the method further comprising:
  a. providing a gripping portion defined by said carrier and disposed between said strap portion and said second end portion, and
  b. providing a first stabilizer, said first stabilizer being defined by said carrier and attached to said gripping portion, said first stabilizer not being attached to said first end portion or to said strap portion, said pressure sensitive adhesive being disposed on said first side of said first stabilizer;
  c. stabilizing said loop and the object by attaching said first stabilizer to said first end portion using said pressure sensitive adhesive, whereby said first stabilizer resists rolling motion of said loop and the object.

25. The method of claim 16, the method further comprising: providing an anti-peel portion, said carrier defining said anti-peel portion, said anti-peel portion extending from said first end portion and toward said strap portion, said pressure sensitive adhesive being disposed on said first side of said anti-peel portion whereby said anti-peel portion resists peeling of said end portion from the support surface when said carrier is attached to the support surface.

* * * * *